(12) United States Patent
Joseph

(10) Patent No.: US 9,328,537 B2
(45) Date of Patent: May 3, 2016

(54) INVENTORY AND ANTI-THEFT ALARM SYSTEM

(71) Applicant: Joseph Joseph, Jamaica, NY (US)

(72) Inventor: Joseph Joseph, Jamaica, NY (US)

( * ) Notice: Subject to any disclaimer, the term of this patent is extended or adjusted under 35 U.S.C. 154(b) by 0 days.

(21) Appl. No.: 14/506,117

(22) Filed: Oct. 3, 2014

(65) Prior Publication Data

US 2015/0022359 A1 Jan. 22, 2015

Related U.S. Application Data

(63) Continuation-in-part of application No. 14/181,136, filed on Feb. 14, 2014, now Pat. No. 8,947,235, which is a continuation-in-part of application No. 13/200,778, filed on Sep. 30, 2011, now Pat. No. 8,669,873.

(51) Int. Cl.
| | |
|---|---|
| *G08B 13/14* | (2006.01) |
| *E05B 73/00* | (2006.01) |
| *G06Q 10/08* | (2012.01) |
| *G08B 13/24* | (2006.01) |
| *E05B 45/06* | (2006.01) |

(52) U.S. Cl.
CPC ............ *E05B 73/0017* (2013.01); *E05B 45/06* (2013.01); *G06Q 10/087* (2013.01); *G08B 13/2417* (2013.01); *G08B 13/2462* (2013.01); *G08B 13/2482* (2013.01); *G08B 13/2434* (2013.01)

(58) Field of Classification Search
CPC ............... G06K 19/0717; G06K 19/07372; G08B 13/2448; E05B 73/0017
USPC ................. 340/572.1–572.9, 10.1; 235/487
See application file for complete search history.

(56) References Cited

U.S. PATENT DOCUMENTS

| | | | |
|---|---|---|---|
| 6,092,932 A * | 7/2000 | Pekala et al. .................... 383/75 |
| 2008/0084313 A1* | 4/2008 | Seidel .......................... 340/572.9 |
| 2010/0164710 A1* | 7/2010 | Chung et al. ................ 340/539.1 |
| 2013/0033364 A1* | 2/2013 | Raz et al. ..................... 340/10.1 |
| 2013/0075481 A1* | 3/2013 | Raymond et al. ............. 235/492 |

* cited by examiner

*Primary Examiner* — Phung Nguyen
(74) *Attorney, Agent, or Firm* — Stephen E. Feldman; Feldman Law Group, P.C.

(57) ABSTRACT

An inventory and anti-theft alarm tag system that includes at least one RFID tag including an RFID transmitter, a counting chip and a locking mechanism having a pressure sensor. The counting chip can be activated when the locking mechanism is in a locked position. The inventory and anti-theft alarm tag system also includes a master database for communication between the at least one RFID tag and the master database via the RFID transmitter. The at least one RFID tag transmitting counting chip information to the master database. The counting chip information including an open position in response to pressure being applied to the pressure sensor. The master database tracking a logical sequence of the counting chip information for the at least one RFID tag, and, if the counting chip information is out of logical sequence, the master database sends an alert.

9 Claims, 8 Drawing Sheets

INVENTORY AND ANTI-THEFT ALARM SYSTEM

CROSS-REFERENCE TO RELATED APPLICATIONS

This application is a continuation in part of U.S. patent application Ser. No. 14/181,136, filed on Feb. 14, 2014, now U.S. Pat. No. 8,947,235, which is a continuation in part of U.S. patent application Ser. No. 13/200,778, filed on Sep. 30, 2011, now U.S. Pat. No. 8,669,873, which patent applications are incorporated here by reference in their entirety to provide continuity of disclosure.

BACKGROUND

The present invention relates to an inventory and anti-theft alarm system using Radio Frequency Identification, aka "RFID". In current RFID technology, if an RFID inventory tag is removed from an item of merchandise and the RFID inventory tag is left on premises (e.g., the original location of where the item of merchandise was located) but the associated item is stolen, an RFID tag inventory scan would locate the RFID tag and consider the item accounted for. These inventory scans are typically done with an RFID handheld device or an antenna array and the scans fails to detect the actual item of merchandise as missing from the premises because the tag can still be located. This leads to a false conclusion that the item of merchandise associated with the tag is still on the premises.

SUMMARY

The present invention provides for an inventory and/or anti-theft alarm system that can monitor the opening or closing of an alarm tag equipped with an RF chip and an RFID inlay to provide a unique rolling sequence of logical events for tracking and analyzing an item of merchandise. This is done to determine if the rolling sequence of events is performed in proper logical sequential order.

In particular, each alarm tag of the present invention includes an encoded unique RFID inlay that has a unique number assigned to each tag and has the ability to be located within a designated area, e.g., a store, warehouse or container. The alarm tag also includes an RF transmitter, a circuit or a "counting/cut chip", a locking pin 6 and a cable/clutch assembly 8 that keeps monitors and keeps track of the sequential events and numbers such events so that every time the locking pin is locked (circuit closed) or unlocked an event can be recorded.

The "counting/cut" chip and the RFID inlay may share the same tag as there is a systematic association between the "counting/cut" chip and the unique encoded RFID inlay number. The "counting/cut" chip and the RFID inlay interact with each other to permit the writing of data or the reading of data relative to the locking or unlocking or cut cable/broken circuit transactions at the tag. These locking/unlocking events are used to discover if an inappropriately sequenced event occurs and if so, the inappropriately sequenced event will be referred to a manager for potential theft investigation.

The present invention employs RFID technology to provide a logical real time or near-real time status concerning the locking and unlocking of the tag associated with the item of merchandise via the opening and/or closing of the on-board circuit. The system will also identify whether the tagged item is or is not present on the premises and if on premises, identify the location of the merchandise.

In some implementations, an inventory and anti-theft alarm tag system, comprises: at least one RFID tag including an RFID transmitter, a counting chip and a locking mechanism having a pressure sensor, the counting chip being activated when the locking mechanism is in a locked position; and a master database for communication between the at least one RFID tag and the master database via the RFID transmitter, the at least one RFID tag transmitting counting chip information to the master database, the counting chip information including an open position in response to pressure being applied to the pressure sensor, the master database tracking a logical sequence of the counting chip information for the at least one RFID tag, and, if the counting chip information is out of logical sequence, the master database sends an alert. In some implementations, the counting chip information can be out of logical sequence when an open position is not associated with a sale. In some implementations, the counting chip information can include each locked position and each open position of the locking mechanism.

In some implementations, the inventory and anti-theft alarm tag system can further comprise: an on-board power supply for supplying power to the at least one RFID tag. In some implementations, the inventory and anti-theft alarm tag system can have an alert that notifies store personnel of a potential theft. In some implementations, the inventory and anti-theft alarm tag system can have a locking mechanism that includes a pin being inserted into a clutch mechanism.

DETAILED DESCRIPTION

An inventory and antitheft alarm tag utilizes RFID technology. The system provides either real time, near-real time or time of scan inventory and theft control while monitoring the time and date of each lock/unlock event and the sequence of these events.

FIGS. 1A-C and 2 illustrate a RFID tag system for the present invention as it is applied to an item of merchandise. The present invention provides for a system that provides an inventory and/or anti-theft alarm tag or label utilizing RFID technology. As each item is presented as inventory in the system it can be tagged or labeled with RFID technology that contains a unique RFID item number and is then associated with a SKU in a master database. If the item is selected for purchase by a customer, it is scanned at point of sale using an RFID scanner or handheld, and the RFID tag or label is deactivated and can be used again for another item of merchandise.

The master database 15 may also be interrogated by the system. The master database 15 (FIG. 2) contains pertinent information which is systematically matched to or related by information to the RFID tag 5. The master database 15 may contain, by way of non-limiting illustrative example, information such as SKU, color, style, size, cost, retail price, quantities, etc. of each item of merchandise. As noted previously, each item of merchandise will have its own unique RFID tag 5. The RFID tag 5 information includes a unique serial number which can include, but is not limited to, product keys such as for a class or department code to identify the associated item the tag 5. The master database 15 can index through the unique RFID items and their corresponding SKUs and/or other relevant information providing a valuable tool for identifying and locating the item being sought. In addition this information permits the present invention to effectively track the sequence for each lock/unlock/cut cable/commissioning/scan activity and assign a number for each activity, as described below in detail.

The disclosed technology ties RFID technology to a database so that the opening and closing of an RFID tag is captured by the opening/closing of a "circuit" with each insertion or removal of a tag pin which in turn ties directly to a logical sequence of open/close events flow of a piece of merchandise.

Figure 1A:
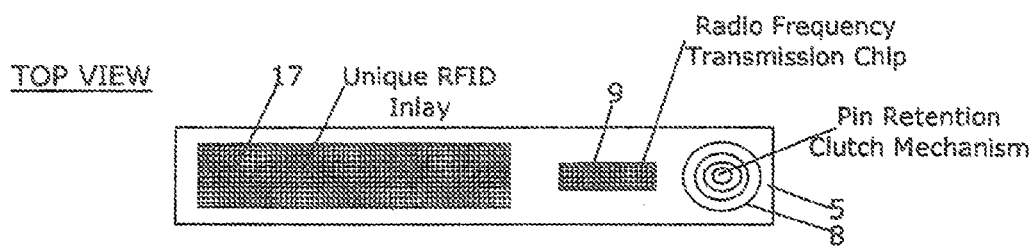
FIG. 1A is a top view or the RFID Tag of the present invention.
Figure 1B:
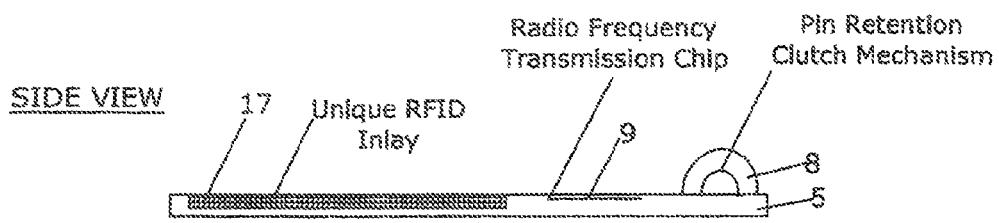
FIG. 1B is a side view of the RFID Tag of the present invention.
Figure 1C:
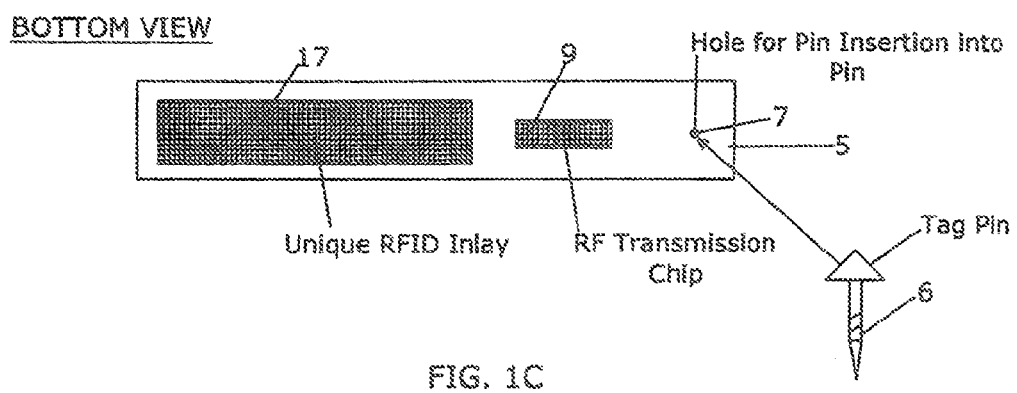
FIG. 1C is a bottom view of the RFID Tag of the present invention.
Figure 9A:
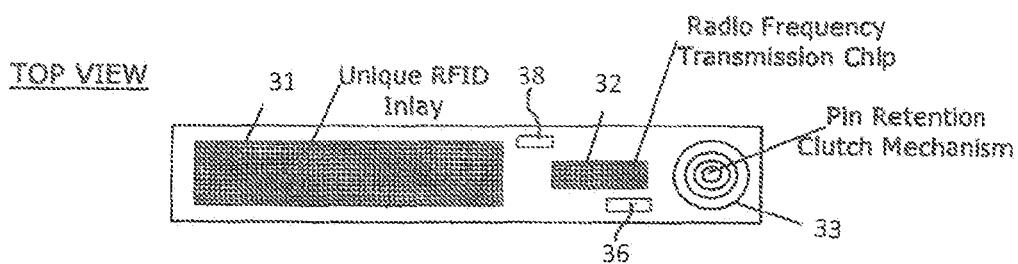
FIGS. 9a-c are various views of the RFID Tag of the present invention.
Figure 9B:
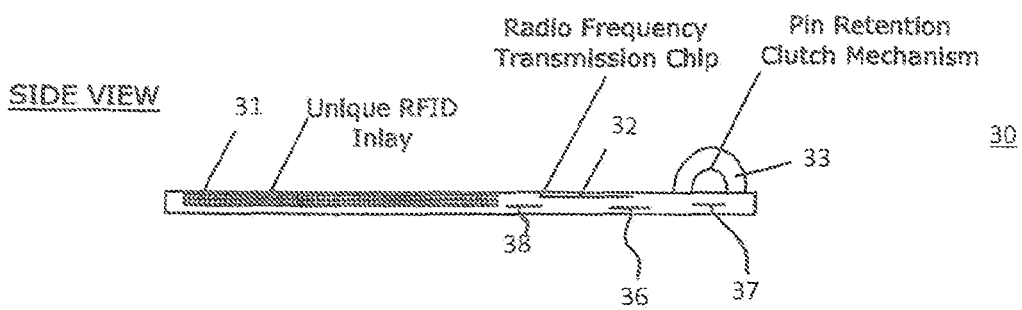
Figure 9C:
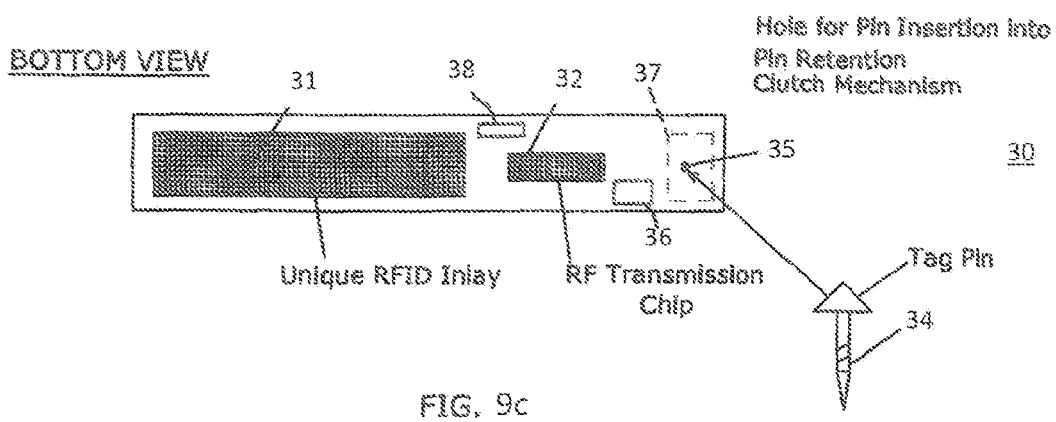

FIGS. 1A-C illustrate how the RFID tag 5 may be attached to an item of merchandise such as but not limited to a garment item or a pair of shoes. In a preferred embodiment of the present invention, as shown in FIG. 1A-C, an RFID tag 5 is equipped with a locking pin 6, a cable/clutch assembly 8, an on-board RF transmitter 9, a circuit, and/or a "counting/cut" chip incorporated in the RFID inlay 17. The "counting/cut" chip can keep track of sequential events using sequence numbers that increase by "1" every time the locking pin 6 is locked or unlocked or in the event the cable is cut which effectively breaks the circuit. Further, every time the event sequence number changes, caused by a locking or unlocking event or a cut cable, the on-board counting/cut chip would transmit the new sequence number to the RFID inlay 17 in the same tag 5 and/or to a receiver in the location. The insertion of the pin 6 or cable into the clutch mechanism in effect closes the loop in the circuit. If the pin is removed, or the cable is cut, the circuit is broken and the breaking of the circuit triggers a sequence event to the counting/cut chip. As shown in FIGS. 9a-c, the RFID tag 30 includes a unique RFID inlay 31, a radio frequency transmission chip 32, a counting chip 36 and a locking mechanism 33, e.g., a pin retention clutch mechanism 33 having a tag pin 34 and a pin insertion hole 35 as described above. In some implementations, the RFID tag can also incorporate a pressure sensor 36 that surrounds the pin insertion hole 35 within the RFID tag 30. That is, the pressure sensor 36 can be integral with the locking mechanism 33 and the counting chip 36. In use, if there is an undue amount of force applied to the locking mechanism 33, e.g., a force greater than one pound, the pressure sensor 36 triggers an open condition within the counting chip 36. The counting chip 36 will then transmit the open condition to the master database 15 and the master database 15 will determine if the open condition is out of sequence or in-sequence. If out of sequence, the master database 15 will trigger an alert signal, e.g., an alert can be sent to store personnel that a theft of merchandise may be occurring. This pressure sensor 37 allows the RFID tag to create an open condition whenever the locking mechanism 33 is being tampered with, e.g., an attempt to cut or remove the RFID tag 30 from an article is occurring. In another implementation, the pressure sensor 37 can incorporated with the counting chip 36 so that if there is an undue pressure applied to the pin 34 itself or the head of the pin 34, this pressure will activate the pressure sensor 37 and an open condition will be triggered within the counting chip 36. This open condition will then be evaluated on-board the tag 30 by comparing data contained on the RFID inlay 31 with the open condition event and, using a logic function or some other determination function, a determination will be made on-board the RFID tag 30 to see if the open condition is an in-sequence or out-of-sequence event. If out of sequence, an alert is triggered and is transmitted to the master database 15.

The software used by the invention is proprietary in design and as such we are providing an overview. The insertion of a pin 6 or lanyard into the clutch mechanism causes a transmission of a closed status for that particular RFID Tag 5 and its on-board circuitry 17. This information as well as date, time, operator, etc. are stored in the memory of the RF chip on the tag as well as in the master database and as such the "counting/closing" begins. Upon the pin being released from the clutch and/or the cable being cut, the circuit is broken triggering an "open" transaction that is captured by the database and stored. The software tracks status of the tag and updates status, for example, the tag is open and the circuit is open, the tag is closed by operator onto the garment, the tag is closed and circuit is closed, the data of the tag is passed electronically to a database and/or when the tag closes a Status Reported to Master Database and a Unique Sequence Event Recorded.

The tag 5 has an RFID inlay 17 and a pin 6 that is inserted into an opening 7 and locked in place by a clutch mechanism 8 to affix the tag 5 to the item of merchandise as shown in FIGS. 1A-C. The pin 5 and clutch mechanism 8 can be unlocked and relocked at point of sale. When the pin 5 is inserted into the clutch 8 at the time of RFID commissioning it completes a circuit for notifying the resident memory of the RFID tag or counting/cut chip that the tag is locked and records the time and date of each subsequent lock/unlock event. This information is provided to the master database 15 using the unique RFID encoded item number and the master database records the sequence of events for each RFID tag. The encoded item number which can be encoded in the inlay 17 that the item is locked and in inventory as well as the lock/unlock sequence number.

The process of "commissioning" is the process wherein the SKU, item number or UPC number of the item is "married" with the unique RFID number contained in the tag. This is accomplished by first obtaining a standard BAR code read of the item's SKU and then associating that number with the unique RFID number in the master database. Alternatively, if the SKU number is already known, the software can marry that number with the unique RFID number. This can be done on a conveyor system or one-by-one using a standard BAR code scanner and an RFID reader/writer. The associated pairing of the BAR code SKU and RFID tag number can be accessed by using either number as the index key within the system.

Figure 3:
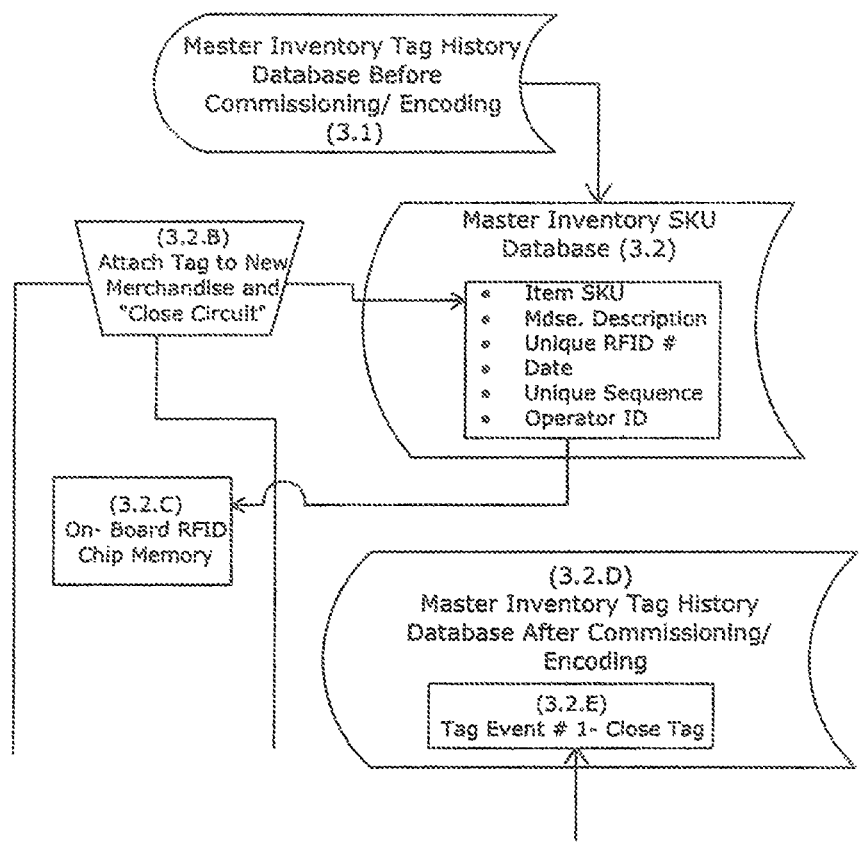
FIG. 3 is illustration of the present invention.

FIG. 3 shows a block diagram for the system. The Master Inventory Tag History Database before encoding of a new tag has no information on a tag until it is encoded (3.1.). The Master Inventory SKU Database contains information on every item that has been encoded (3.2) including, but not limited to: Item SKU, Merchandise Description, Unique RFID Tag Number, Date of Activity, Unique Sequence Number, and Operator ID (3.2.A). The RFID tag is attached to the new merchandise and "Close Circuit" status is sent to the Master Inventory Tag History Database (3.2.B). Master Inventory Tag History Database After Commissioning/Encoding (3.2.D) evidenced by "Tag event #1—Closing of Tag" (3.2.E) and the association of that tag information is loaded to the Master Inventory SKU Database 3.2. The on-board memory chip (3.2.C) or resident memory of the RFID tag or counting/cut chip is now in-synch with the Master Inventory SKU Database. Master Inventory Tag History Database After Commissioning/Encoding (3.2.D) shows that after encoding, the Master Inventory Tag History Database (3.2.B) now contains the unique event of the tag. e.g., the closing of the tag 3.2.E.

The counting/cut chip and the RFI) inlay that share the same tag 5 are "partnered or married (associated)" with each other creating a systemic association linking the counting/cut chip ID with the unique RFID inlay's number for that particular tag 5. This is done so that they are only associated and interact with each other. In this way writing of data or reading of data relative to lock/unlock or cut cable transactions at the tag level can only happen between the corresponding, partnered chip and RFID inlay for that particular tag 5.

The counting/cut chip can include: an onboard or resident memory; an onboard power supply, e.g., a battery or a solar cell for powering a circuit. The counting/cut chip counts locking/unlocking or cut cable sequences; transmits information directly to the master database 15, a receiver or a handheld if the circuit is broken via the cable being cut or the pin being locked or unlocked. It can also transmit information directly to the memory of its paired RFID inlay if the circuit is broken via the cable being cut or the pin being locked or unlocked. As shown in FIGS. 9*a-c*, the on-board power supply 38 allows the RFID tag 30 to transmit counting information to the master database 15 without the need for interrogation of the RFID tag 30. This allows the RFID tag 30 to transmit an open condition to the master database 15 when the RFID tag 30 is being tampered with during a potential merchandise theft. Once the RFID tag 30 transmits an open condition to the master database 15, the master database 15 will determine if the open condition is out of sequence, e.g., an open condition not associated with a sale, and if so, the master database 15 will transmit an alert, e.g., the alert can be a text message to manager that a potential theft is occurring.

Figure 4:
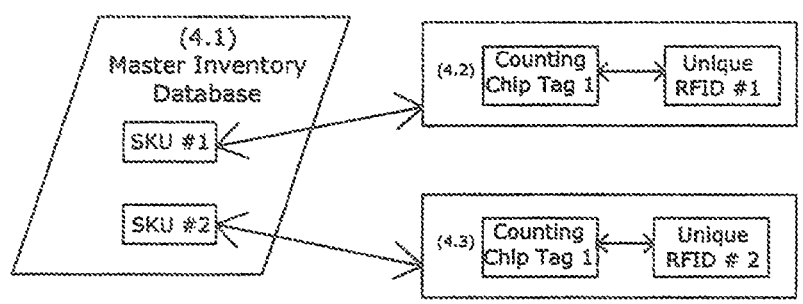
FIG. 4 is illustration of a master inventory database of the present invention.

As shown in FIG. 4, the Master Inventory Database contains information on all SKUs and UPCs and has a direct 1:1 unique relationship with each article of merchandise identified with a unique RFID tag illustrated in 4.2 and 4.3. Each RFID tag contains a unique RFID and unique counting chip that only communicates with each other and has a unique 1:1 relationship with a particular item of clothing. The association of that tag and the item of clothing is exclusive. This means that no other tag can be associated with that article of clothing in the database (4.1).

The tag 5 can be one of the following: (a) the tag incorporates a separate counting/cut chip for writing to the enclosed RFID chip and/or (b) the tag is the RFID hybrid wherein the change in status of the tag (locked or unlocked) is written directly into the memory portion of the embedded RFID chip thus eliminating the need of an additional counting/cut chip. This encoding or commissioning is accomplished by taking user defined data and electronically writing it into the embedded memory of the RFID chip, using either an RFID antenna or other devices such as but not limited to an array of antennas, a handheld RFID scanner device, a RFID capable printer or any other RFID writeable device, (c) the tag is a radio frequency/RF chip 9 for transmitting data directly to a continuously scanning receiver for providing information to the inventory management system. This is done when the chip is energized by a receiver or changes in status.

Figure 2:
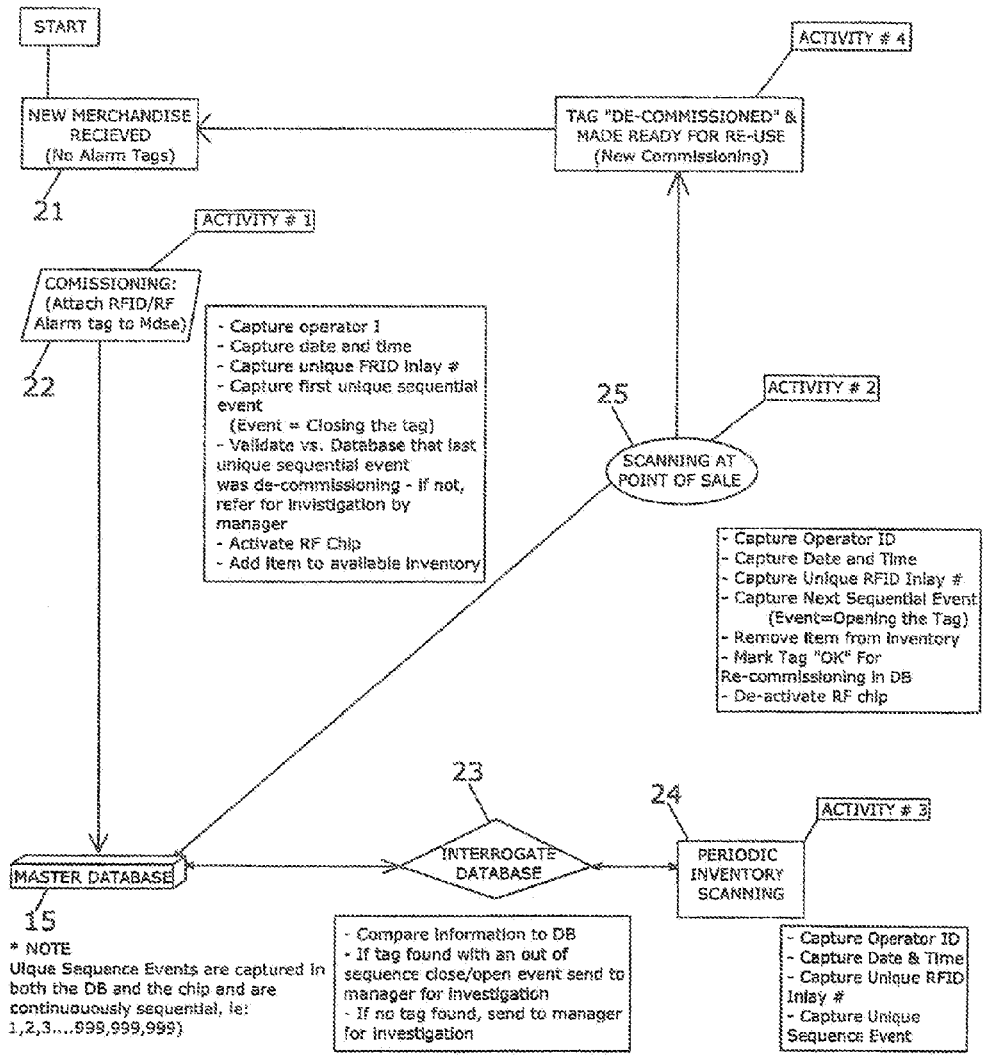
FIG. 2 is a flow chart illustrating the system of the present invention.

The RFID tag 5 communicates via an RF transmitter 9 to a master database 15 (See FIG. 2). The master database 15 stores and can compare the information from the RFID tag 5 with the history of that particular RFID tag 5 to check the number of times the tag 5 has been locked and unlocked. It also compares the data on the tag 5 with the data in the master database 15.

Figure 5:
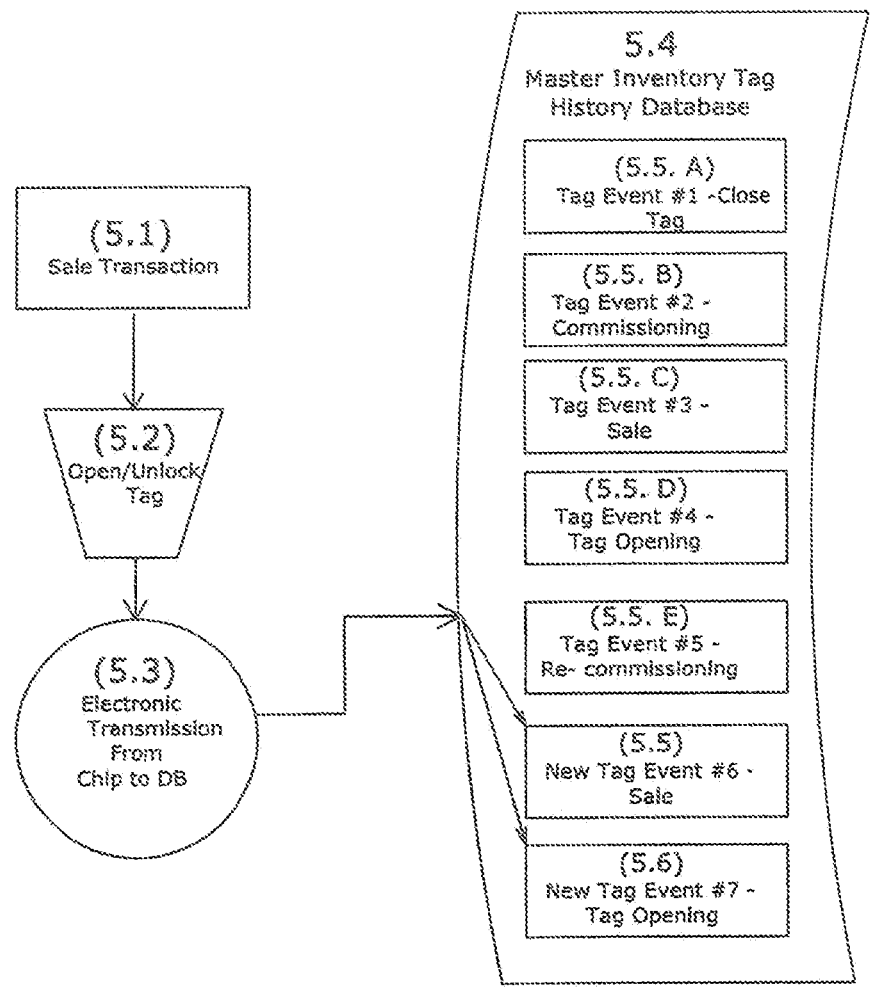
FIG. 5 is illustration of a master inventory tag history database of the present invention.
Figure 6:
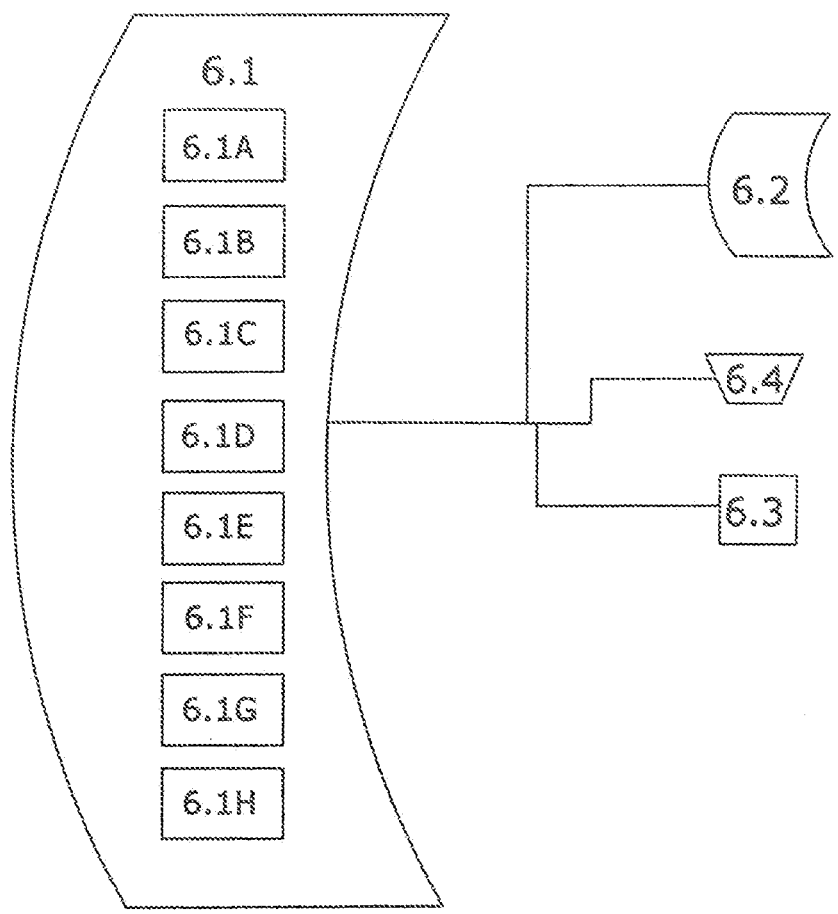
FIG. 6 is illustration of a master inventory tag history database of the present invention.
Figure 7:
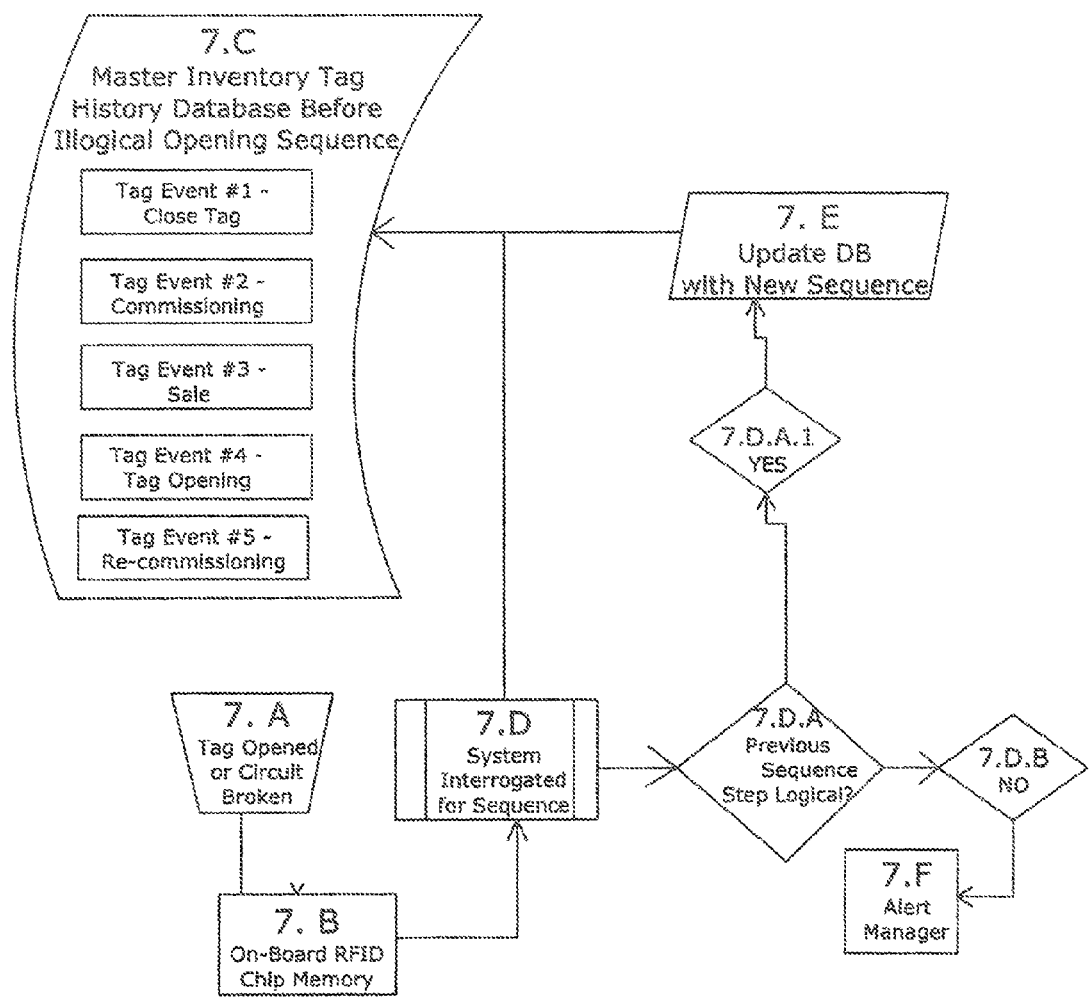
FIG. 7 is a flow chart illustrating an embodiment of the present invention.
Figure 8:
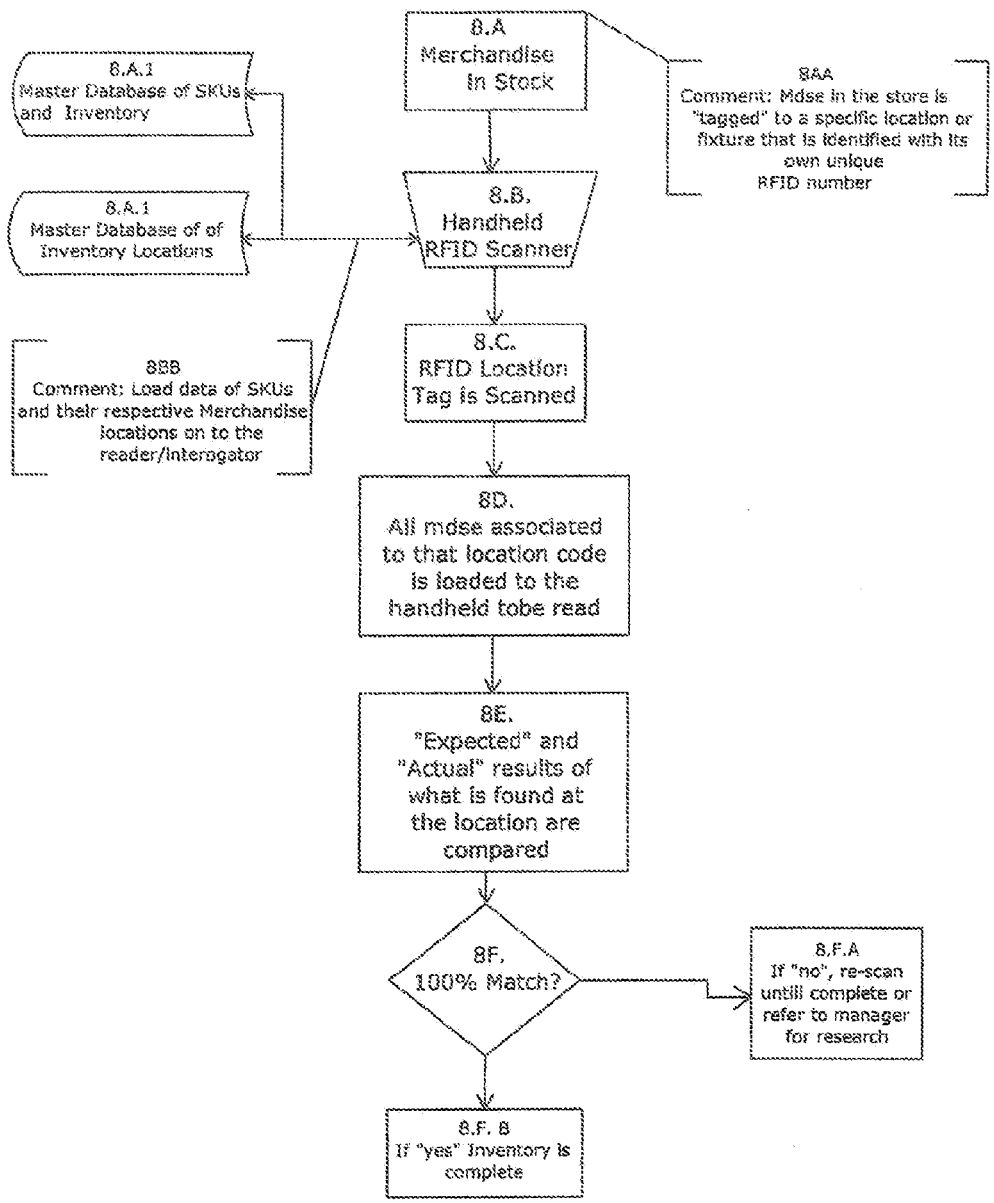
FIG. 8 is a flow chart illustrating an embodiment of the present invention.

As shown in FIG. 5, a sale transaction (5.1) allows the operator to unlock the RFID enabled tag (5.2) which creates an electronic transmission (5.3) to the Master Inventory Tag History Database (5.4) that updates the history for that tag with the event of the sale (5.5) and the opening of the tag (5.6) that are added to the existing sequences of past unique events for this tag: For examples, Tag Event #1—the first closing of the tag, Tag Event #2—the commissioning of the tag. Tag Event #3—the sale of the merchandise associated with the tag, Tag Event #4—the opening of a tag after the sale, Tag Event #5—the re-commissioning of the tag on a new piece of merchandise.

Each time an item of merchandise is sold the tag 5 is retired for that item and then the tag 5 is re-commissioned for a new item of merchandise. In this way the tag 5 is opened to remove it from the sold item and closed for the new item which the tag is now affixed to so that the master data base 15 has a history of this removal and reuse (replacement) for merchandise items in association with that particular tag 5. This POS—point of sale-transaction, accomplished by RFID scan, systematically transmits this data and information to the master database 15. As seen in FIGS. 1A, 1B and 1 C each RFID tag 5 has its own unique RFID inlay 7 and either a counting/cut chip or else the change in status of the tag 5 (e.g. locked or unlocked) is written directly into the memory of the embedded RFID chip and no additional counting/cut chip is required.

In the example, prior to a re-commissioning event, the Master Inventory Tag History Database (6.1) contains seven events relative to a specific RFID tag: Tag Event #1: initial close of the tag, Tag Event #2: initial commissioning of the tag to a piece of merchandise, Tag Event #3: a sale transaction, Tag Event #4: The opening of the tag after the sale to remove from the merchandise, Tag Event #5: The re-commissioning/re-use of the tag to a new piece of merchandise, Tag Event #6: The subsequent sale of that merchandise and Tag Event #7: The opening of the tag after the sale.

This information is maintained in the Master Inventory Tag History Database (6.1) as well as the Master Inventory SKU database (6.2) as well as in the resident memory of the RFID tag (6.3). In the example, when the tag is attached to a new piece of merchandise, (6.4) the Master Inventory Tag History Database (6.1) and the Master Inventory SKU database (6.2) as well as in the resident memory of the RFID tag (6.3) are updated with a new unique event (6.1.H) that represents the tag closing and the re-commissioning of that tag onto a new piece of merchandise.

As seen in FIG. 2 the system of the present invention operates as follows: The system 20 receives a new item of merchandise (step 21). The RFID Tag 5 is attached or affixed to this merchandise (step 22). During this step the tag is commissioned (tag is closed, attached or affixed onto a piece of merchandise as described in FIGS. 1A-C and it is paired with the RFID number and SKU as well as an operator ID is captured by the system). The date and time is recorded for that merchandise item when the tag is affixed. The RF inlay is recorded by a systemic transaction which updates the master database 15 such as, by way of non-limiting example, a scan of the RFID chip by an RFID reader scan; the first sequential event is recorded—e.g. the locking of the tag 5 on this item of merchandise; a validation is performed by the master database 15: that the last unique event was a decommissioning of the tag (and if not it is referred for investigation). The chip is then activated and the item is added to the inventory in the master database 15 marking the item as commissioned. If a POS sales transaction associated with the unique RFID chip makes logical equable sense in terms of the locking/unlocking/cut data then no alert is sent for investigation. One such logical sequential sequence would be a prior commissioning event, followed by a sales transaction event, followed by a re-commissioning event, tied to a new item of merchandise. If there was a non logical sequence, then the item would be referred to the manager to investigate. The physical chip may or may not remain active at all times and available for scanning. The new item is added to the inventory in the master database 15 and is available in inventory.

This illustrates the sequence of events when a tag is opened, or the circuit is broken on a tag. When the system recognizes that a tag is open, (7.A), the on-board RFID chip (7.B) captures the event and reports that back to the Master Inventory Tag History Database (7.C) where the logical sequence of the event is checked versus prior events (7.D), If the sequence is logical (7.D.A) & (7.D.A.1) then the Master Inventory Tag History Database (7.C) is updated with the next sequence event (7.E). If the event is not logical (7.D.A) & (7.D.B), an alert is sent to the Manager (7.F) for further interrogation and review. In other words, if a decommission event (open) occurs before a sales event (open) this sequence would be illogical according to the rules established in the master database. Once an illogical event takes place, a flag is triggered for investigation or review to see why the illogical sequence occurred.

The data base 15 is systematically interrogated (step 23) and compares information from the tag 5 for the new merchandise item 21 with the master database 15. If the tag is determined to be an out of sequence event e.g. the number of opens and closes do not make logical sequential sense, then the item is flagged within the database and the item will require a further security investigation. In other words, the data on the tag 5 is compared with the data in the master database 15 to validate that the locking/unlock sequence makes logical sense using data such as, but not limited to, date, time and prior unique historical events. This further investigation status for the item can be displayed in the master database 15 and can be sent as a report, an email message or an automated cell phone call or text message to the manager to investigate the status of this item. Also if no tag is found, a notification is sent to the manager to investigate by the same aforementioned means. The system is capable of periodic scanning as defined by the user using antenna arrays or hand held RFID scanners or any other suitable devices.

Software for inventory tracking is resident on the RFID handheld, computer, or other device used for inventory. Each display location has a unique RFID location. In the master database, items of inventory are associated 1:1 to that display location. A daily or ad-hoc download of those relationships are loaded into the handheld reader and or other RFID reading device. The scanning operation requires the operator to scan the RFID location tag and then "search" for each of the associated items of inventory. Software within the RFID reader provides either an audio or visual display of items expected to be in that location or as the scan progresses and items are identified, they are dropped off the list viewable on the screen. When all items have been found, the operator is advised as such. Items not found are referred for investigation.

To take inventory of merchandise stock (8.A), subsets of the inventory Master Database of SKUs & Inventory stock (8.A.1) and the Master Database of Inventory Locations (8.A.2) are loaded onto a Handheld RFID Scanner, Computer with Antenna array, etc. (8.B). A location is selected from the Location database and the scanner reads the location code (8AA) for that location (8.C). The merchandise associated with that location code is loaded to the mobile device to be read (8.D) and reading begins (8.E) and compares "expected" results with "actual" results found. If there is a 100% match (8.F), inventory is complete (8.F.B). If there is not a 100% match in step (8.F), the differences between "actual" and "expected" results (8.F.A) are flagged or sent to the manager or any designated employee for research.

(Step 24). Such periodic scanning could be continuous and ongoing, include daily or ad-hoc inventory, weekly inventory, monthly inventory, semi-annual inventory or an annual inventory period. This periodic scanning will capture all the user defined fields on the master database 15 and in the RFID chip as is required to complete all scanning that is required. At a point of sale transaction an RFID scan captures and updates the master database 15 with the user defined unique employee operator ID of the employee performing the sale transaction, the date and time of the transaction, the unique RFID inlay number of the item of merchandise associated with that transaction. The next sequential event e.g. the unlock sequence number.

The captured sale transaction also removes the tag 5 from inventory in the master database 15 and identifies the tag 5 in the master database 15 as being available for re-commissioning. This is accomplished by updating the individual record for that RFID tag 5 as being "sold" and available for re-commissioning or reuse, and thus permitting the unique number of the RFID tag 5 to become associated with another item of merchandise in the master database 15 (step 21). Thus the present invention provides for an inventory and antitheft alarm tag utilizing RFID technology providing for either real time or time of scan inventory and theft control while monitoring the time and date of each locking/unlocking event and the sequence of these events.

While presently preferred embodiments have been described for purposes of the disclosure, numerous changes in the arrangement can be made by those skilled in the art. Such changes are encompassed within the spirit of the invention as defined by the appended claims.

What is claimed:

1. An inventory and anti-theft alarm tag system, comprising:
   at least one RFID tag including an RFID transmitter, a counting chip and a locking mechanism having a pressure sensor, the counting chip being activated when the locking mechanism is in a locked position; and
   a master database for communication between the at least one RFID tag and the master database via the RFID transmitter, the at least one RFID tag transmitting counting chip information to the master database, the counting chip information including an open position in response to pressure being applied to the pressure sensor, the master database tracking a logical sequence of the counting chip information for the at least one RFID tag, and, if the counting chip information is out of logical sequence, the master database sends an alert.

2. The inventory and anti-theft alarm tag system of claim 1, further comprising:

an on-board power supply for supplying power to the at least one RFID tag.

3. The inventory and anti-theft alarm tag system of claim 1 wherein the alert notifies store personnel of a potential theft.

4. The inventory and anti-theft alarm tag system of claim 1 wherein the locking mechanism is a pin being inserted into a clutch mechanism.

5. The inventory and anti-theft alarm tag system of claim 4, wherein the counting chip information includes an open position in response the pin being removed.

6. The inventory and anti-theft alarm tag system of claim 1 wherein the counting chip information includes each locked position and each open position of the locking mechanism.

7. The inventory and anti-theft alarm tag system of claim 1 wherein the counting chip information is out of logical sequence when an open position is not associated with a sale.

8. The inventory and anti-theft alarm tag system of claim 1, wherein the locking mechanism is a cable being inserted into a clutch mechanism.

9. The inventory and anti-theft alarm tag system of claim 8, wherein the counting chip information includes an open position in response to the cable being cut.

\* \* \* \* \*